Dec. 7, 1943.     W. BAYES     2,336,157
STUD DRIVER
Filed April 4, 1942
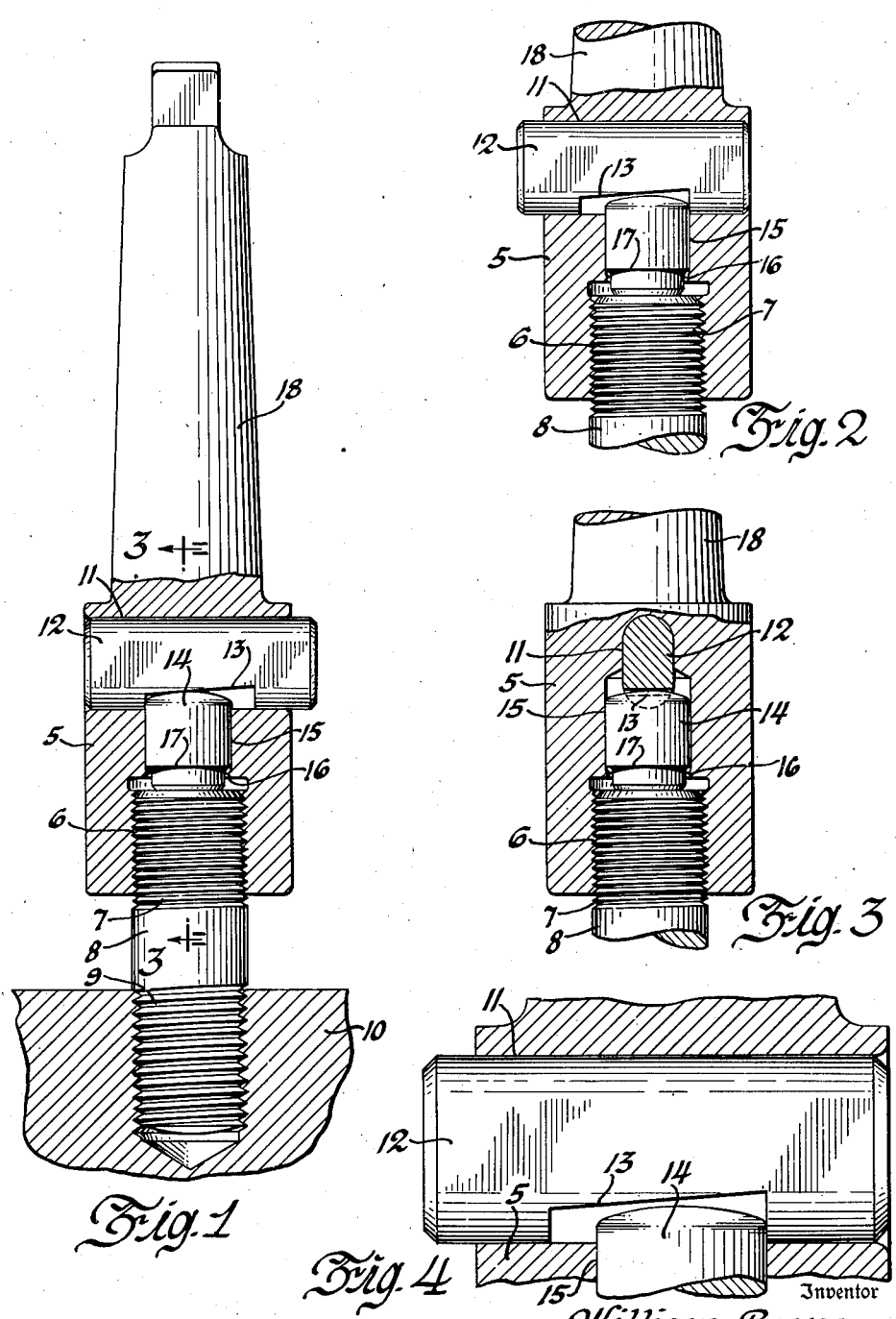
Inventor
William Bayes
By Blackmore, Spencer & Flint
Attorneys Patented Dec. 7, 1943

2,336,157

UNITED STATES PATENT OFFICE 2,336,157

STUD DRIVER

William Bayes, Cleveland, Ohio, assignor to General Motors Corporation, Detroit, Mich., a corporation of Delaware Application April 4, 1942, Serial No. 437,656

1 Claim. (Cl. 81—53)

My invention consists in a stud driving tool for screwing studs which are threaded at both their ends into internally threaded holes in the cylinder block of an internal combustion engine or similar devices wherein separate plates are employed to close the ends of a crankcase, wherein a cylinder head is to be readily removable and replaceable, or wherein an auxiliary device is to be fastened to an engine block or similar structure. In such uses the studs are of such diameters that they fit tightly into the threaded holes aforesaid, and they are not intended to be removed after having been screwed into the threaded holes provided for them.

The driver has an internally threaded recess into which one end (the exposed end after it has been screwed into a threaded hole as aforesaid) of a stud to be driven may be screwed; and it has features of construction, and capabilities of operation, such that after one end of a stud has been screwed into the hole provided for it the driver may be unscrewed from the exposed threaded end of the stud without unscrewing the stud from the internally threaded hole into which it is screwed.

The driver itself may be driven in various ways but it is shown as having a standard Morse taper shank so that it may be driven by an electrically driven portable tool, having a reversible driving shaft equipped with a tapering socket adapted to receive the shank aforesaid of the driver.

In the accompanying drawing wherein the preferred form of my improved stud driving tool is shown:

Figure 1 is a sectional view showing my invention and illustrating the mode of operation thereof.

Figure 2 is a fragmentary view showing a wedge member of the tool in another position.

Figure 3 is a fragmentary view showing a section upon a plane indicated by the line 3—3, Figure 1.

Figure 4 is a view similar to Figure 2 but showing the parts enlarged, and in part in different positions.

Referring now to the drawing, my improved stud driver comprises a lower cylindrical portion 5 having an internally threaded recess 6 into which the threaded upper end 7 of a stud 8 may be screwed. This stud is threaded at both its ends as shown; and the purpose of my invention is to screw the lower ends 9 of such studs as are indicated by the numeral 8, into internally threaded holes spaced apart from one another in a structure 10; which is assumed to be a cylinder block of an internal combustion engine. The studs therefore provide holding elements extending through holes in a crankcase cover plate, a cylinder head or other element whereby said element may be fastened to the block by nuts, not shown, engaging the upper ends 7 of the studs. The threads upon the two ends of the studs are commonly identical as regards pitch and diameter, so that either end may be screwed into holes provided for them in the block 10; but the diameters of the threads within the holes for receiving the inner ends 9 of the studs are commonly somewhat less than the diameters of the threads upon said inner ends, so that the inner ends of the studs fit tightly within the holes in the cylinder block into which they are screwed and are intended to remain in place permanently, after their inner ends 9 have been screwed into the holes provided for them by my improved stud driving tool.

Housed within a transversely extending passage 11 in the cylindrical portion 5 is a reciprocatory wedge member 12 having an inclined surface 13 which engages the upper end of a locking plug 14 which is movable vertically within an axial passage, also located in said cylindrical portion, and which plug is forced downward and into engagement with the upper extremity of a stud to be driven as said wedge member is driven laterally to the right, as will be understood from Figures 1 and 3; thus forcing the thread at the upper end of the stud into firm engagement with the thread within the recess 6 and, because of the friction between the two threads, thus preventing rotation of the stud relative to the driving tool and jamming of said threads (due to torsion transmitted through the stud) because, as hereinbefore explained, of the tight fit between the lower threaded end 9 of the stud and the internally threaded hole in the member 10 into which it screws. After the lower end 9 of a stud has been screwed into the internally threaded hole provided for it the wedge member 12 is driven to the left, see Figures 2 and 4, thus releasing the driver from the friction between the thread within the recess 6 and the external thread 7 and permitting the same to be unscrewed from the upper end of the stud without unscrewing the lower end 9 thereof from the threaded hole in the block 10 into which it is screwed.

The locking plug 14 is housed within an internal passage 15 the lower end of which is peened inwardly, as at 16, to thereby engage a ledge 17 and prevent the plug from falling from the passage. This ledge (the wedge member 12 being in place before the peening is done) also prevents the upper end of the locking plug 14 from descending far enough to allow the wedge member 12 to leave the transverse passage 11 within which it is housed as will be understood from Figure 4.

Although as hereinbefore explained, my improved stud driving tool is shown as having a Morse taper shank 18 whereby it is driven, the manner in which, or the means whereby it is driven to screw studs into the holes provided for them, forms no part of the invention to which this present application relates.

Having thus described and explained my invention I claim and desire to secure by Letters Patent:

A stud driving tool comprising an integral single piece body member having driving means at its upper end, and an internally threaded recess at its lower end adapted to receive the threaded upper end of a stud to be driven; a locking plug movable vertically within an internal passage of lesser diameter than and disposed above said internally threaded recess, and which plug has an external annular ledge above its lower end, and the lower end of which plug is adapted to abut against the upper end of a stud to be driven; a reciprocating wedge member movable in a passage extending transverse to said driving tool, and having an inclined surface adapted to engage the upper extremity of the plug aforesaid when said wedge member is moved laterally in said transversely extending passage; and means on the body member located above the upper end of said internally threaded recess and above the lower end of said plug, and which means cooperates with said ledge to provide a stop to prevent escape of the plug through the threaded opening and for preventing the upper end of said locking plug from descending below the path of movement of said reciprocating wedge member.

WILLIAM BAYES.